United States Patent
Edington et al.

(10) Patent No.: US 11,580,171 B2
(45) Date of Patent: Feb. 14, 2023

(54) SYSTEM, METHOD AND INTERFACE FOR COMPILED LITERARY WORK

(71) Applicant: HarperCollins Christian Publishing, Inc., Nashville, TN (US)

(72) Inventors: Robert L. Edington, Thompson's Station, TN (US); John Cain, Ann Arbor, MI (US); Jeffrey Hendricks, Nashville, TN (US); John Crawford, Hendersonville, TN (US); Robert Branch, Nolensville, TN (US)

(73) Assignee: HARPERCOLLINS CHRISTIAN PUBLISHING, INC., Nashville, TN (US)

( * ) Notice: Subject to any disclaimer, the term of this patent is extended or adjusted under 35 U.S.C. 154(b) by 930 days.

(21) Appl. No.: 14/210,955

(22) Filed: Mar. 14, 2014

(65) Prior Publication Data
US 2014/0279710 A1   Sep. 18, 2014

Related U.S. Application Data

(60) Provisional application No. 61/787,308, filed on Mar. 15, 2013.

(51) Int. Cl.
*G06F 7/00* (2006.01)
*G06F 16/93* (2019.01)

(52) U.S. Cl.
CPC .................................. *G06F 16/93* (2019.01)

(58) Field of Classification Search
CPC .... G07F 7/1008; G06Q 10/087; G06Q 30/02; G06Q 30/06; G06Q 20/20; G06Q 10/08
USPC ................................ 235/385, 383, 375, 376
See application file for complete search history.

(56) References Cited

U.S. PATENT DOCUMENTS

| | | |
|---|---|---|
| 2001/0051943 A1 | 12/2001 | Drucker et al. |
| 2006/0112085 A1 | 5/2006 | Zijlstra et al. |
| 2007/0174314 A1 | 7/2007 | McSherry et al. |
| 2008/0065609 A1 | 3/2008 | Jenkins et al. |
| 2008/0215570 A1 | 9/2008 | Maloney et al. |
| 2009/0150533 A1* | 6/2009 | McClanahan ..... G06F 17/30079 709/223 |
| 2011/0035370 A1 | 2/2011 | Ortega et al. |

OTHER PUBLICATIONS

International Application No. PCT/US2014/025650 International Search Report and Written Opinion dated Sep. 18, 2014, 8 pages.
EP Application No. 14769401.2 Extended Search Report dated Aug. 22, 2016, 7 pages.

(Continued)

*Primary Examiner* — Thien M Le
(74) *Attorney, Agent, or Firm* — Cantor Colburn LLP

(57) ABSTRACT

A system, method and interface for compiling literary works from specialized databases and/or from unique interfaces is provided, including a custom database compiled from plural existing literary indexes, wherein a master index is harmonized from said existing indexes according to common terms (e.g., book, chapter and verse for biblical indexes) with deleted duplicates. In exemplary embodiments, the master index is also augmented by ingestion of additional literary works in digital form that are chopped up based on said common terms (e.g., book, chapter, verse) extracted from the literary work.

16 Claims, 15 Drawing Sheets

(56) References Cited

OTHER PUBLICATIONS

CA Application No. 2,905,933 Office Action dated Feb. 5, 2020, 6 pages.
Canada Office Action for Canada Application No. 2905933; filed Sep. 11, 2015; dated Feb. 23, 2022; 4 pages.
European Office Action for European Application No. 14769401.2; dated Sep. 18, 2019; 6 pages.

* cited by examiner

Topic Search

FIG. 2

Author Search

16

| Home | FAQs | Contact | Account ▼ | Administrator |

Max Lucado | Search

Topic ○  Book Title ○  Author ⦿

Your search "max lucado returned the following 7 results:

Authors

Title                                                          Author           ISBN

[author TITLE]

Fearless —18                                                   Max Lucado      ISBN9780849921391
                                                                  20               22

[author TITLE]

Grace for the Moment Volume II                                 Max Lucado      9781410526719

[author TITLE]

God came near                                                  Max Lucado      ISMN9780849921216

[author]

FIG. 3

Filtering Results

| Friend | Search |

Topic ● Book Title ○ Author ○

Your search "Friend" returned the following 19 results:

Narrow Your Results

[Narrow] [Clear]

Add Selection To Collection

Book Title
- ☐ God's Wisdom for Your Every Need
- ☐ Sanctuary
- ☐ Timeless Truths Touching God In You
- ☐ Daily Living: 365 Brief Devotionals To Begin Your Day
- ☐ Real Marriage: The Truth about Sex, Friendship & Life Together
- ☑ Jesus Calling
- ☐ Prayers To Move Your Mountains
- ☐ God's Promises For Your Every Need
- ☑ Daily Splashes of Joy
- ☑ Forever In Love
- ☐ The Journey: How to Summary [Show]

Details

| Topic | Title | Scripture Reference | Text |
|---|---|---|---|
| FRIEND [Source] | A Charles Dickens Devotional | John 15:13 | ABOUT FRIENDSHIP<br>Martin began to work at the grammer-school next morning, with so much vigour and expedition, that Mr. Pinch had new reason to do homage to the natural endowments of that young gentleman, and to acknowledge his infinite superiority to himself. The new pupil received Tom's compliments very graciously; and having by this time conceived a real regard for him, in his own peculiar way... read more<br>[Already in collection "Friendship"] [Full] Word Count: 503 |
| FRIEND [Source] | Daily Splashes of Joy | Proverbs 17:17 | September 28<br>A friend loves you all the time. (PROVERBS 17:17 NCV)<br>Make a friendship kit:<br>Rubber bends: To hold friends close<br>Tissues: To dry a tear<br>Recipes: To make and share<br>Stationery: To write notes of encouragement<br>Band-Aids: Reminders that friends help heal a hurting heart<br>Poems: To express your love<br>Prayers: To lead your friend to God<br>Put your arms around each other<br>(This page 1... read more<br>[Add] [Limited] Word Count 88 |
| FRIEND [Source] | Daily Splashes of Joy | Proverbs 18:24 | July 29<br>A real friend will be more loyal than a brother, (PROVERBS 18:24 NCV)<br>If you're going to encourage other folk, the b is with yourself Collect only "life-lifters" and [^ Back To Top] |

FIG. 5

Download

![Screenshot 48]

chalice.thomasnelson.com/account/collections

Chalice

Home | FAQs | Contact | Account ▼ | Administrator

Account

Manage Your Account
Edit Profile
Collections

Collections

| Title | Number of Items | Actions |
|---|---|---|
| 1Devo | 1 | View Download Delete Copy To User |
| Adversity1 | 2 | View Download Delete Copy To User |
| Authentic | 1 | View Download Delete Copy To User |
| BetaQA01 | 5 | View Download Delete Copy To User |
| Chapter_mixup | | ownload Delete Copy To User |
| Copyright_test | | ownload Delete Copy To User |
| Dates_example | | ownload Delete Copy To User |
| Frenemy | | ownload Delete Copy To User |
| Friend | | ownload Delete Copy To User |
| Friendship | | ownload Delete Copy To User |
| Hearts and Minds | 2 | View Download Delete Copy To User |
| IMABE | 3 | View Download Delete Copy To User |
| link2_beta | 2 | View Download Delete Copy To User |
| link_too | 4 | View Download Delete Copy To User |
| New_Books | 1 | View Download Delete Copy To User |
| OCR_title1 | 2 | View Download Delete Copy To User |

Download Collection  x

Select Format [Word ▼]

Download

*FIG. 6*

Devotional

MARCH 23

FISHING FOR MEN

Follow Me, and I will make you fishers of men.

MATTHEW 4 : 19

Fishermen in the first century used special tools for catching fish. One was a line and hook (Matt. 17:27). Another was a spear or possibly a type of harpoon (Job 41:26). A third was the dragnet (Matt. 13:47). It was sometimes over three hundred feet long and about eight feet wide. Fishermen buoyed up one side with corks and weighed down the other side with lead sinkers. Sometimes they stretched the net between two boats and rowed in a circle. They would then draw in ropes attached to the bottom of the net, trapping the fish (John 21:6).

In today's verse, however, Jesus was referring to a casting net, which had a circular form (about fifteen feet in diameter) made of fine mesh and lead sinkers around the edge. Attaching a long piece of line to the center of the net, the fisherman would cast it into shallow water. He then would draw up the center of the net by its cord and wade into the water to secure the catch.

Just as the disciples caught a school of fish within the reaches of the circular net, the Lord wants His contemporary disciples to reach out to the men and women around us.

---

Copyright Info

Truth for Today

John MacArthur
9781418552206 http://www.thomasnelson.com/truth-for-today.html

Copyright c 2001 by John MacArthur

*FIG. 7*

ADMINISTRATOR SCREENS - Dashboard

*FIG. 8*

ADMINISTRATOR SCREENS - Manage Books

ADMINISTRATOR SCREENS - Editing a Book (metadata)

64

```
← → C 🏠 | 🗋 chalice.thomasnelson.com/administrator/books/edit/2                    ☆ □ □ ○ □
```

Chalice | 🏠

| Back To Chalice | Dashboard | Users ▼ | Books ▼ | Terms | Cache ▼ | Account ▼ |

Click directly on text to edit.

Info

| | |
|---|---|
| Title: | Wisdom for Each Day |
| Author: | Billy Graham |
| Publisher: | Thomas Nelson |
| Division: | Thomas Nelson |
| Imprint: | Thomas Nelson |
| ©Year: | 2008 |
| ©Info: | [Click to set] |
| ISBN: | 9781418561437 |
| Book Info: | Life principles and Scripture selections from America's most well known Evangelist. Life comes at us fast and is filled with challenges and questions for each day. Relationships. Finances. Temptations. Setbacks. Where do we turn for answers and wisdom? God's Word and the gentle-yet firm-insights of one of the most beloved ministers the world has ever known, are a great place to start each day. Billy Graham, is known and loved for his simple speaking style. Wisdom For Each Day is a beautiful expression of his heart and voice. |
| Book Purchase URL: | http://www.thomasnelson.com/wisdom-for-each-day.html |
| Usage Rights: | Limited - Restrictions May Apply |
| Book Type: | Devotional |
| SPU: | GB01 - GIFT BOOKS |
| Search Depth: | Page |
| State: | Published |
| Featured: | Carousel |

*FIG. 11*

ADMINISTRATOR SCREENS - Editing a Book (text)

| | | | |
|---|---|---|---|
| | chalice.thomasnelson.com/administrator/books/edit/2 | | | with Christ in your heart, you can face the future with confidence, knowing He will lead you in His perfect way.

24     JANUARY 19     [Add Paragraph Scripture] [Set Content Type] Published

| Chapter ID | Title | Content Type | State |
|---|---|---|---|
| 42 | JANUARY 20 | [Set Content Type] | Published |

SCRIPTREFS IN THIS CHAPTER
Isaiah 53:2 - APPEARANCE
1 John 3:2 - ADOPTION, IMMORTALITY, LIKENESS, NOW. REVELATION, Imperfection of man
Isaiah 53: - Philip

[Add Chapter Scripture]

/

/

SCRIPTREFS ON THIS PAGE
Isaiah 53:2 - APPEARANCE
Isaiah 53: - Philip
1 John 3:2 - ADOPTION, IMMORTALITY, LIKENESS, NOW. REVELATION, Imperfection of man

[Add Page Scripture]

| Page | Title | Content | | Content Type | State |
|---|---|---|---|---|---|
| | | JANUARY 20 | | | |
| 25 | JANUARY 20 | | [Add Paragraph Scripture] [Set Content Type] | | Published |
| | | Good Reason | | | |
| 25 | JANUARY 20 | | [Add Paragraph Scripture] [Set Content Type] | | Published |
| | | He had no beauty or majesty to attract us to him, nothing in his appearance that we should desire him. | | | |
| 25 | JANUARY 20 | | [Add Paragraph Scripture] [Set Content Type] | | Published |
| | | ISAIAH 53:2 | | | |
| | | SCRIPTREFS IN THIS PARAGRAPH Isaiah 53:2 - APPEARANCE | | | |
| 25 | JANUARY 20 | | [Add Paragraph Scripture] [Set Content Type] | | Published |

It has always been interesting to me that---outside of the hints given in Isaiah 53---the Bible does not tell us what Jesus looked like, nor were paintings or drawings made of Him during His lifetime. Artists throughout the centuries have tried to imagine what He must have looked like, but the truth is. we don't know.

[^ Back To Top]

FIG. 12

SYSTEM, METHOD AND INTERFACE FOR COMPILED LITERARY WORK

CROSS-REFERENCE TO RELATED APPLICATIONS

This application claims the benefit of U.S. provisional patent application Ser. No. 61/787,308 filed Mar. 15, 2013, the entire contents of which are incorporated herein by reference.

TECHNICAL FIELD

The present invention is generally related to literary works, more particularly, exemplary embodiments of the present invention are related to systems, methods and interfaces for compiling literary works from specialized databases and/or from unique interfaces.

BACKGROUND OF THE INVENTION

Conventional literary works are generated between a writer and a publisher. Even compilations are traditionally controlled by a designated publisher who is tasked with the effort of compiling a compelling work.

What is needed in the art is a mechanism that serves to allow custom compilations from a database in intuitive manners.

SUMMARY OF THE INVENTION

The present system, method and interface for compiling literary works from specialized databases and/or from unique interfaces addresses the need in the art by providing a custom database compiled from plural existing literary indexes, wherein a master index is harmonized from said existing indexes according to common terms (e.g., book, chapter and verse for biblical indexes) with deleted duplicates. In exemplary embodiments, the master index is also augmented by ingestion of additional literary works in digital form that are chopped up based on said common terms (e.g., book, chapter, verse) extracted from the literary work.

In additional exemplary embodiments, an interface communicates with said master index and is configured to provide possible compilation results via search results. Exemplary search results may provide actual keyword results, synonyms or related terms, either generated by the master index or imported from said existing indexes into said master index, with or without a relevancy score. Exemplary embodiments also provide searching at a desired specificity or context, at a paragraph, page, chapter level, etc.

Exemplary embodiments further provide editing tools configured to permit arrangement and publishing of search results. Further exemplary embodiments also provide a mechanism for calculation of compensation to individual authors during compilation, as well as calculation of total royalties due for a particular compiled work.

In further exemplary embodiments, a results list provides an abbreviated results list with clickable portions activating expanded information, e.g., summary, title, topic, results number, material classification (e.g., poem, story sermon), and scripture reference, among others. Results from the master index may also be provided ("chunked") at a predetermined level, e.g., at a page or section level.

An exemplary results interface may also include tools for adding a reference to a result, tools for determining classes of rights to use a piece (e.g., as a color indication of red, yellow, green), word counts (e.g., for purposes of compensation of authors), and filtering of title, authors, terms and the like. The exemplary results interface may also include an acuatable button or link that provides an indication of source of a result, e.g., the precise originating index for any given result.

For exemplary embodiments permitting ingestion of literary works, an exemplary interface may provide an indication of ingestion status, allow association of metadata with definable chunks, allow classification of a literary portion, e.g., as a book type or chunk type, e.g., reference, scripture, devotional, sermon, excerpt, quotation, prayer, biography, story, poem and the like.

The above and other exemplary embodiments will be discussed in more detail below in the detailed description of the invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. In the FIGURES:

FIG. 2 is a further illustration of an exemplary search field;

FIG. 3 is an illustration of an exemplary abbreviated results list interface;

FIG. 5 is an illustration of an exemplary topics results list interface;

FIG. 6 is an illustration of an exemplary download interface;

FIG. 7 is an illustration of an exemplary output sample;

FIG. 8 is an illustration of an exemplary administrator interface;

FIG. 11 is an illustration of an exemplary administrator book editing interface;

FIG. 12 is an illustration of an exemplary detailed administrator editing interface;

DETAILED DESCRIPTION OF THE INVENTION

Figure 1:
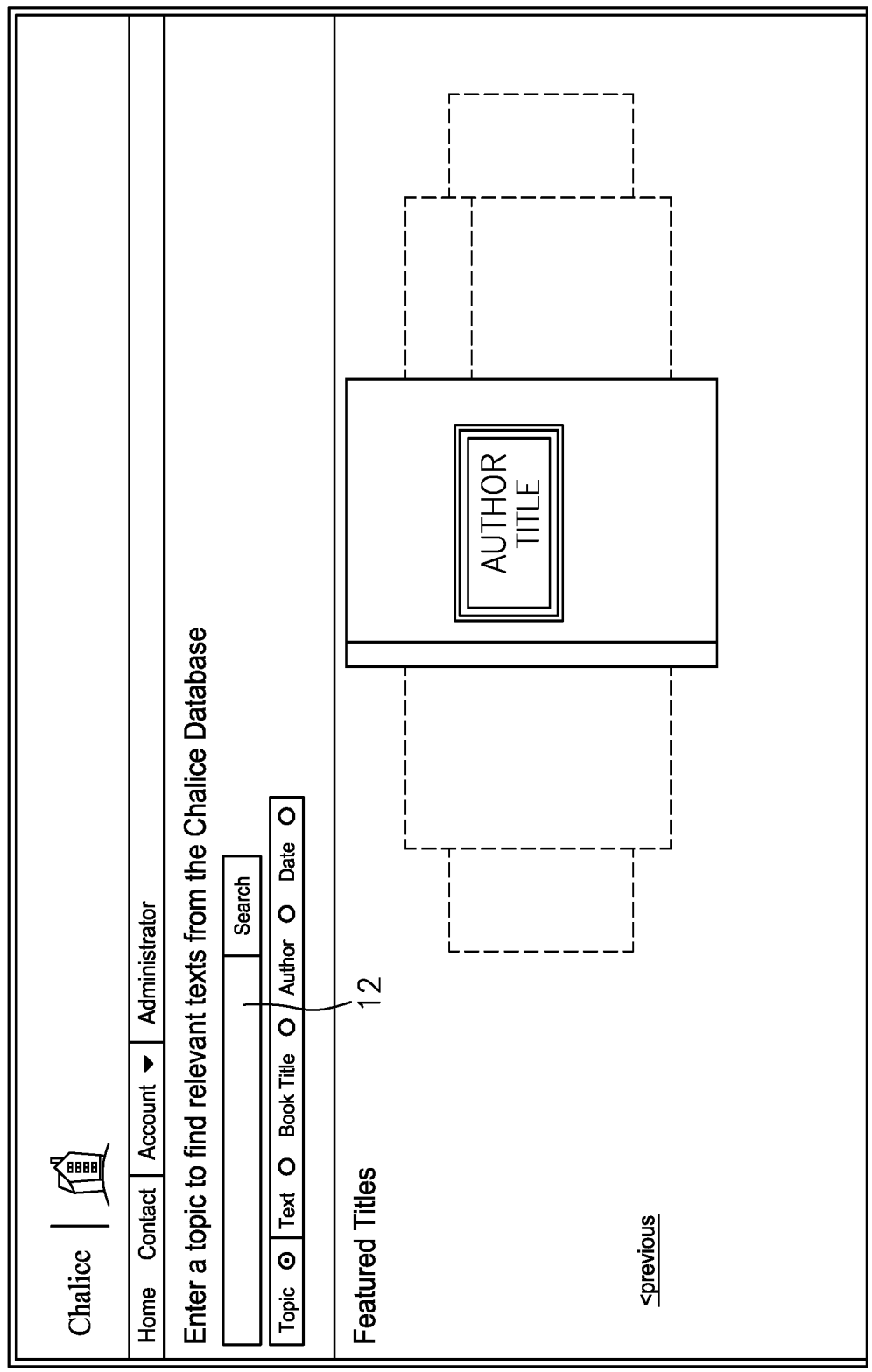
FIG. 1 is a landing page with search field in accordance with an exemplary embodiment of the invention.

Further to the brief description provided above and associated textual detail of each of the FIGURES, the following description provides additional details of example embodiments of the present invention. It should be understood, however, that there is no intent to limit example embodiments to the particular forms and particular details disclosed, but to the contrary, example embodiments are to cover all modifications, equivalents, and alternatives falling within the scope of example embodiments and claims. Like numbers refer to like elements throughout the description of the FIGURES.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGURES. For example, two FIGURES shown in succession, or steps illustrated within any given FIGURE, may in fact be executed substantially concurrently or may sometimes be executed in the reverse order, depending upon the functionality/acts involved.

Hereinafter, exemplary embodiments of the present invention are described in detail.

As we noted above, the present invention relates to a system, method and interface for compiling literary works from specialized databases and/or from unique interfaces addressed the need in the art by providing a custom database compiled from plural existing literary indexes, wherein a master index is harmonized from said existing indexes according to common terms (e.g., book, chapter and verse for biblical indexes) with deleted duplicates. In exemplary embodiments, the master index is also augmented by ingestion of additional literary works in digital form that are cataloged based on said common terms (e.g., book, chapter, verse) extracted from the literary work.

In additional exemplary embodiments, an interface communicates with said master index and is configured to provide possible compilation results via search results. Exemplary search results may provide actual keyword results, synonyms or related terms, either generated by the master index or imported from said existing indexes into said master index, with or without a relevancy score. Exemplary embodiments also provide searching at a desired specificity or context, at a paragraph, page, chapter level, etc.

Exemplary embodiments further provide editing tools configured to permit arrangement and publishing of search results. Further exemplary embodiments also provide a mechanism for calculation of compensation to individual authors during compilation, as well as calculation of total royalties due for a particular compiled work.

In further exemplary embodiments, a results list provides an abbreviated results list with clickable portions activating expanded information, e.g., summary, title, topic, results number, material classification (e.g., poem, story sermon), and scripture reference, among others. Results from the master index may also be provided ("chunked") at a predetermined level, e.g., at a page or section level.

An exemplary results interface may also include tools for adding a reference to a result, tools for determining classes of rights to use a piece (e.g., as a color indication of red (research only), yellow (possible restrictions), and green (ready to publish anywhere)), word counts (e.g., for purposes of compensation of authors), and filtering of title, authors, terms and the like. The exemplary results interface may also include an actuatable button or link that provides an indication of source of a result, e.g., the precise originating index for any given result.

For exemplary embodiments permitting ingestion of literary works, an exemplary interface may provide an indication of ingestion status, allow association of metadata with definable chunks, allow classification of a literary portion, e.g., as a book type or chunk type, e.g., reference, scripture, devotional, sermon, excerpt, quotation, prayer, biography, story, poem and the like.

Referring now to FIG. 1, an exemplary landing page, shown generally at 10, provides an interface with a search field 12 that is configured to allow searching according to predefined levels, e.g., topic, book title, author, text and date. Search options include: topic (relevance based, e.g., on a proprietary index of thousands of terms linked to bible scripture references); text (e.g., searching the full text of included literary works), book title, author and date.

Figure 2:
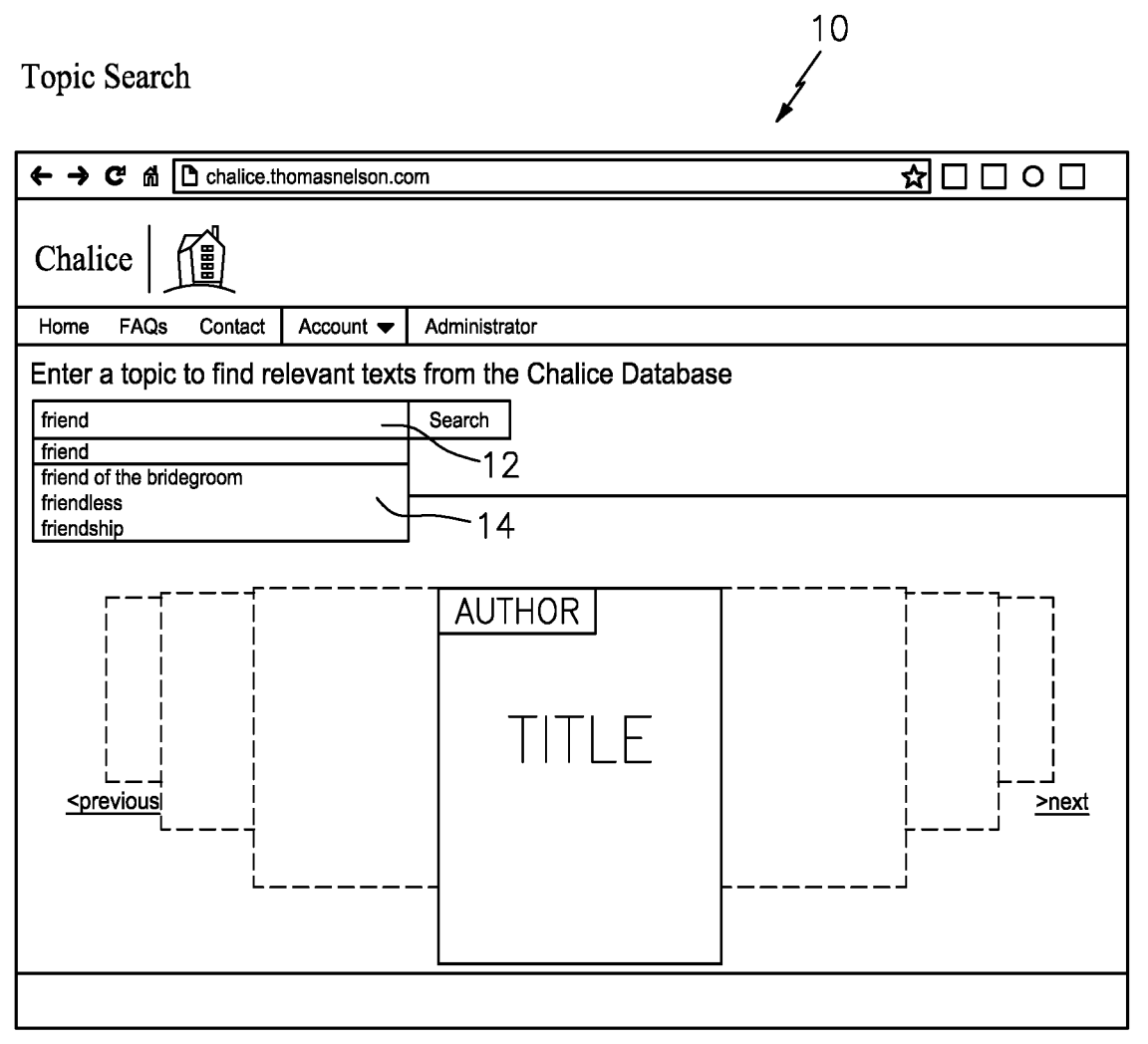

As seen in FIG. 2, the search field 12 may provide suggested terms 14, e.g., from prior search history or from metadata within a master index. The exemplary dropdown shows an array of terms being searched based on text entered.

FIG. 3 illustrates an exemplary abbreviated results list interface, shown generally at 16, including a clickable title 18, author listing 20 and ISSN code 22.

Figure 4:
FIG. 4 is an illustration of a more detailed exemplary results list interface.

FIG. 4 illustrates a more detailed exemplary results page 24 returned in response to selection of the title 18 in FIG. 3, wherein additional book information is provided generally at 26, along with selectable topics 28 found within the title. In exemplary embodiments, selection of a topic may provide related results from within a particular literary work and/or may provide cross-work results from within the master index at large, or from within some subset thereof.

FIG. 5 illustrates a results interface for the term "Friend" at 30, with exemplary filter fields shown generally at 32. Such exemplary fields may include any convenient field, e.g., title, specific topics or categories, book or passage type, etc. FIG. 5 also illustrates an exemplary button for adding plural selected works to a collection at 34, as well as buttons 36 for adding individual works. An exemplary source button 38 provides detailed information with regard to the origin of the selection, and a text field 40 provides expandable text content 42, an indication of author rights 44 and word counts 46. This exemplary interface allows narrowing the number of books, topics or authors in the selection using the left navigation panel options, as well as adding final selections or individual segments to a collection. The exemplary interface also provides the ability to perform, show or calculate a word count per segment to facilitate royalty payment for multiple authors.

FIG. 6 illustrates an exemplary download interface, shown generally at 48, configured to allow viewing, deleting, copying and download of collections in a desired format.

FIG. 7 illustrates an exemplary output sample resultant from a download operation (shown generally at 52), as in FIG. 6. In exemplary embodiments, a link 50 may be provided in the download, permitting a user to purchase the original text online. In exemplary embodiments, this provides marketers with a quick method for generating a topical segment of a source work, including a link to purchase the original online. The buy link may appear, e.g., on a collection edit page, on a copyright section of outputs (.e.g, MS Word or XML outputs), etc.

Figure 8:
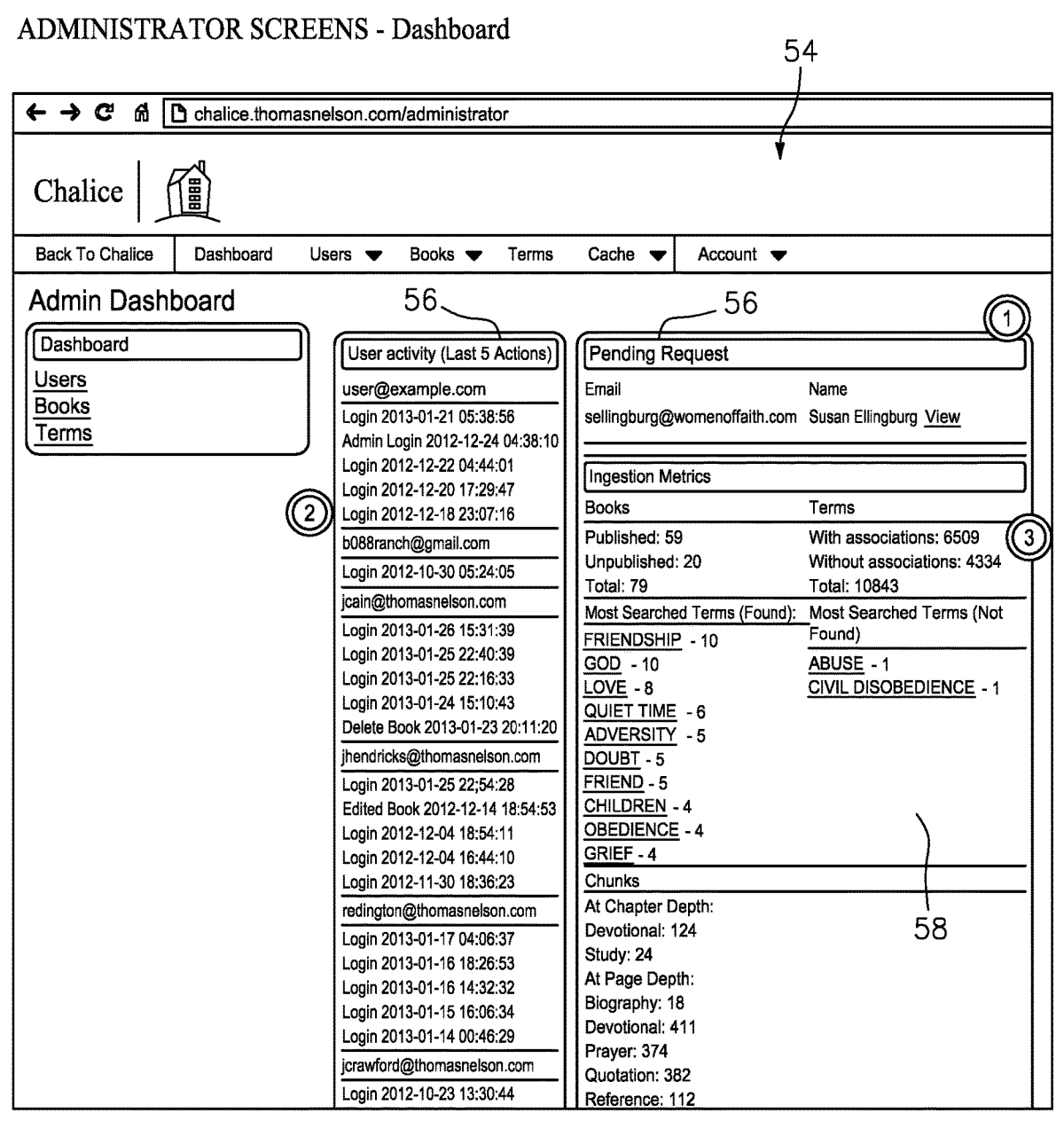

FIG. 8 illustrates an exemplary administrator interface, shown generally at 54, with user access and activity fields 56 and ingestion metrics 58, which may also describe, e.g., most searched terms, chunks at various depths (chapter, page, etc.) and other details. In exemplary embodiments, this provides for user access requests, user activity summary review (e.g., with detailed reports, on demand or customizable), source book ingestion summaries, etc.

Figure 9:
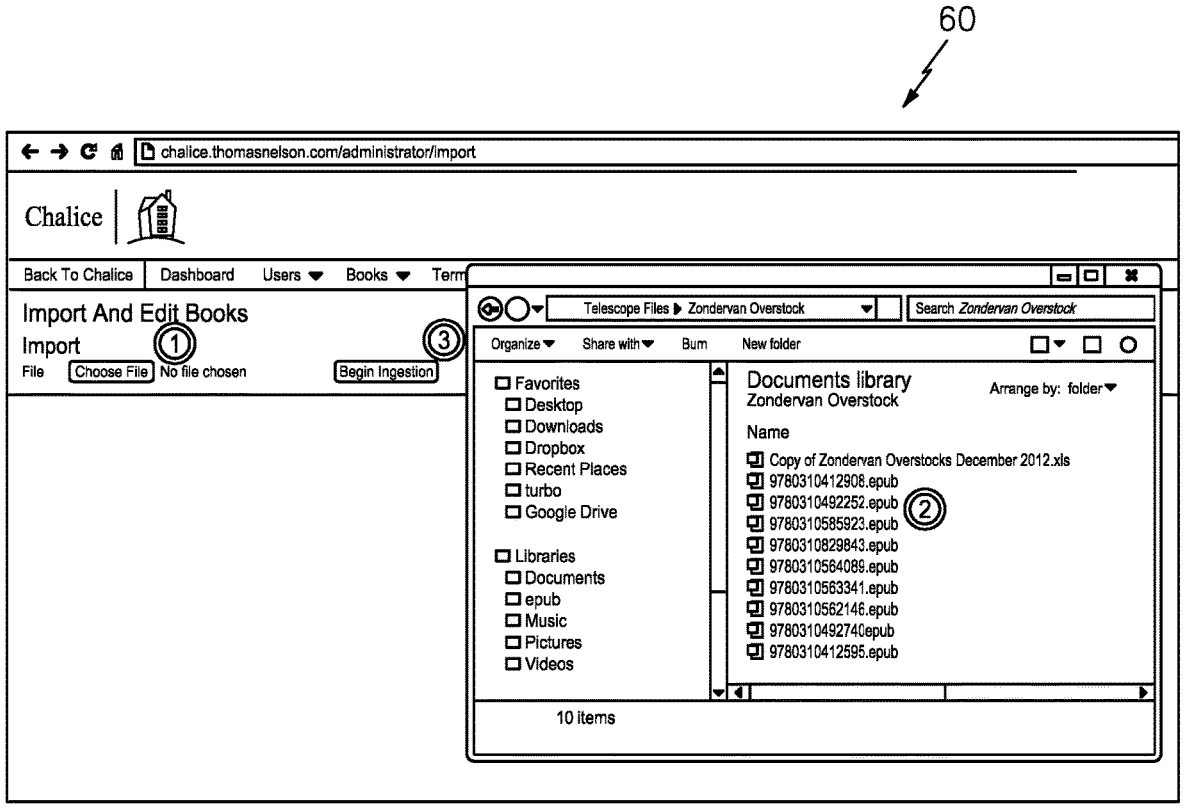
FIG. 9 is an illustration of an exemplary administrator interface for literary importation.

FIG. 9 illustrates an exemplary administrator interface at 60 for importation of books, e.g., in ePUB format. In exemplary embodiments, the interface allows the user to click on the "Choose File" button, select an ePUB file to import and click the "Begin Ingestion" button.

Figure 10:
FIG. 10 is an illustration of an exemplary administrative book management interface.

FIG. 10 illustrates an exemplary book management interface 62, with a listing of searchable, published source books.

FIG. 11 illustrates an exemplary administrator interface 64 that is configured to permit editing of a book with metadata.

FIG. 12 illustrates a more detailed administrator editing interface 66 that permits editing of chapter, page and paragraph level information, including addition of references, definition of content type, etc.

Figure 13:
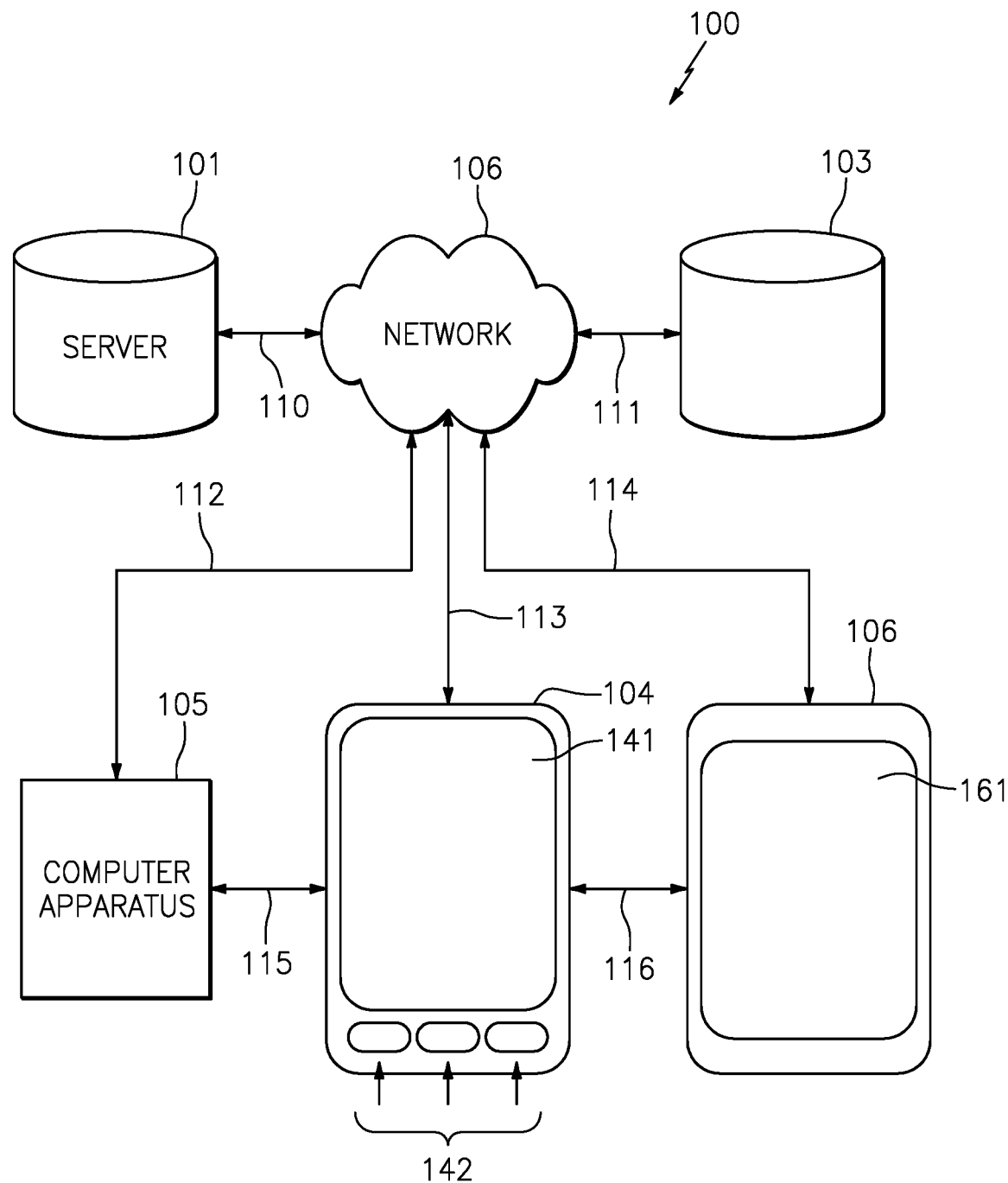
FIG. 13 is an illustration of an exemplary system diagram in accordance with exemplary embodiments of the invention.

FIG. 13 illustrates an exemplary system for compiling literary works from specialized databases and/or from unique interfaces. The system 100 may include a server 101. The server 101 may include a plurality of information, including but not limited to, information and profiles, algorithms and processing modules and other data storage. The server 101 may be in communication with a network 106 via a communication channel 110.

Additionally, the system 100 may access or interface with additional, third party data sources or servers 103. Third party sources of data 103 may be in communication with the network 106 via a communication channel 111. It is noted that although illustrated as separate, the source 103 may include a server substantially similar to server 101. The server 101 or source 103 may include a data service provider, for example, a cellular service provider, a business information provider, or any other suitable provider or repository. The server 101 or source 103 may also include an application server providing applications and/or computer executable code implementing any of the interfaces/methodologies described herein. The server 101 or source 103 may present a plurality of application defaults, choices, set-ups, and/or configurations such that a device may receive and process the application accordingly. The server 101 or source 103 may present any application on a viewer interface or web-browser of a device for relatively easy selection by a viewer of the device. The viewer interface or web-page rendered for application selection may be in the form of an application store and/or application marketplace.

Alternately, another server component or local computer apparatus, e.g., 104, 105 and/or 106, may produce the viewer interface and control connectivity to the server 101 or source 103. Also, the server 101 or one or more of the local computer apparatus 104, 105 and 106 may be configured to periodically access the source 103 and cache data relevant to data used in embodiments of the present invention.

The network 106 may be any suitable network, including the Internet, wide area network, and/or a local network. The server 101 and the source 103 may be in communication with the network 106 over communication channels 110, 111. The communication channels 110, 111 may be any suitable communication channels including wireless, satellite, wired, or otherwise.

An exemplary system 100 further includes computer apparatus 105 in communication with the network 106, over communication channel 112. The computer apparatus 105 may be any suitable computer apparatus including a personal computer (fixed location), a laptop or portable computer, a personal digital assistant, a cellular telephone, a portable tablet computer, a portable audio player, or otherwise. For example, the system 100 may include computer apparatuses 104 and 106, which are embodied as a portable cellular telephone and a tablet, respectively. The apparatuses 104 and 106 may include display means 141, 161, and/or buttons/controls 142. The controls 142 may operate independently or in combination with any of the controls noted above.

Further, the apparatuses 104, 105, and 106 may be in communication with each other over communication channels 115, 116 (for example, wired, wireless, Bluetooth channels, etc); and may further be in communication with the network 106 over communication channels 112, 113, and 114.

Therefore, the apparatuses 104, 105, and 106 may all be in communication with one or both of the server 101 and the source 103, as well as each other. Each of the apparatuses may be in severable communication with the network 106 and each other, such that the apparatuses 104, 105, and 106 may be operated without constant communication with the network 106 (e.g., using data connection controls of an interface). For example, if there is no data availability or if a viewer directs an apparatus to work offline, e.g., without immediate network connection, the data used by any of the apparatuses 104, 105, and 106 may be based on stored or cached information/parameters. It follows that each of the apparatuses 104, 105, and 106 may be configured to perform the methodologies described in the various exemplary embodiments.

Furthermore, using any of the illustrated communication mediums, the apparatuses 104, 105, and 106 may manipulate, share, transmit, and/or receive different data previously or currently produced at any one of the illustrated elements of the system 100. For example, data may be available on the server 101 and/or the source 103. Moreover, viewers of any of the devices 104, 105, and 106 may independently manipulate, transmit, etc., data, e.g., to separately determine a current value of the index at a given time.

Additionally and as described above, example embodiments of the invention may be embodied in the form of computer-implemented processes and apparatuses for practicing those processes. Therefore, according to an example embodiment, the methodologies described hereinbefore may be implemented by a computer system or apparatus. A computer system or apparatus may be somewhat similar to the mobile devices and computer apparatuses described above, which may include elements as described below.

Figure 14:
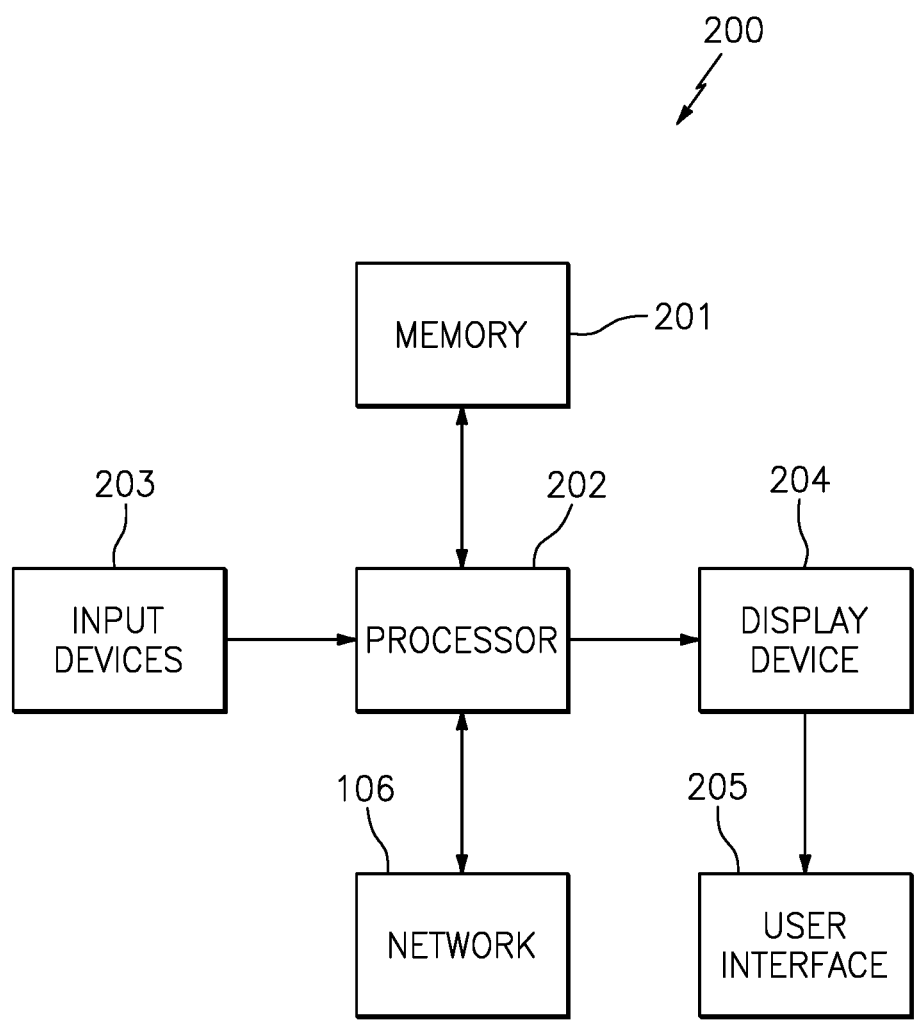
FIG. 14 is an exemplary computer system diagram.

FIG. 14 illustrates a computer apparatus, according to an exemplary embodiment. Portions or the entirety of the methodologies described herein may be executed as instructions in a processor 202 of the computer system 200. The computer system 200 includes memory 201 for storage of instructions and information, input device(s) 203 for computer communication, and display device 204, which may display a user interface 205. The computer system 200 may further be connected to the network 206.

Thus, the present invention may be implemented, in software, for example, as any suitable computer program on a computer system somewhat similar to computer system 200. For example, a program in accordance with the present invention may be a computer program product causing a computer to execute the example methods described herein.

Figure 15:
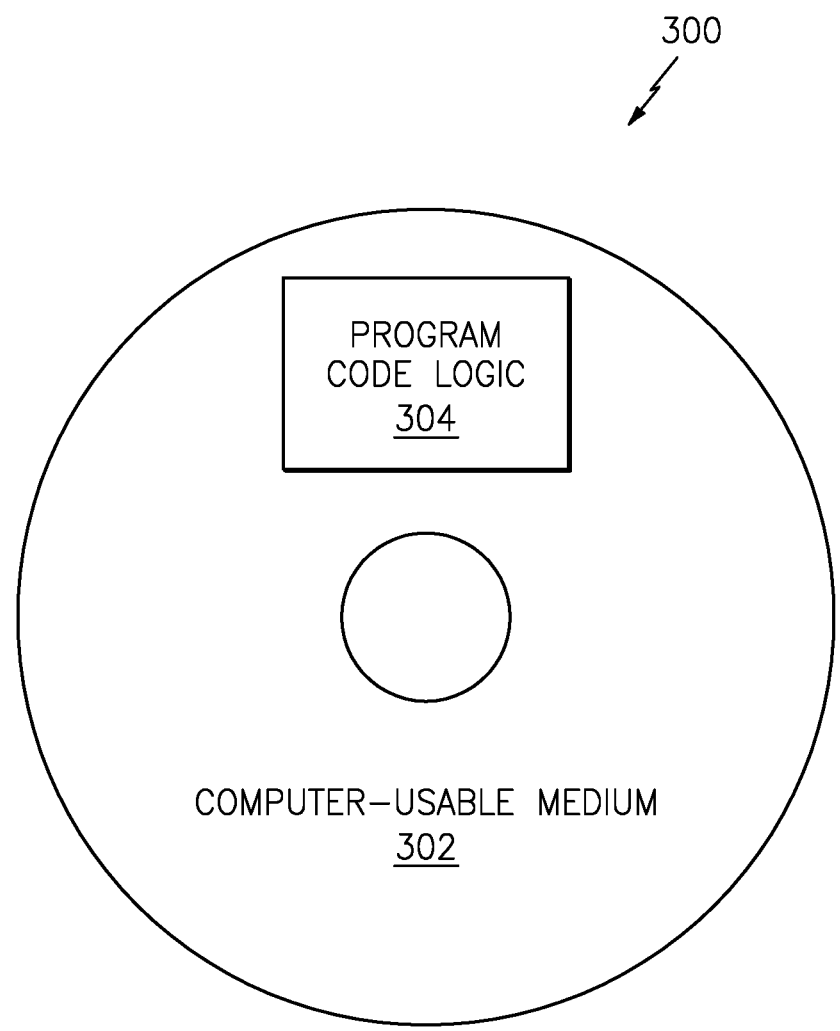
FIG. 15 is an exemplary computer-usable medium in accordance with exemplary embodiments described herein.

Therefore, embodiments can be embodied in the form of computer-implemented processes and apparatuses for practicing those processes on a computer program product. Embodiments include the computer program product 300 as depicted in FIG. 15 on a computer usable medium 302 with computer program code logic 304 containing instructions embodied in tangible media as an article of manufacture. Exemplary articles of manufacture for computer usable medium 302 may include floppy diskettes, CD-ROMs, hard drives, universal serial bus (USB) flash drives, or any other computer-readable storage medium, wherein, when the computer program code logic 304 is loaded into and executed by a computer, the computer becomes an apparatus for practicing the invention. Embodiments include computer program code logic 304, for example, whether stored in a storage medium, loaded into and/or executed by a computer, or transmitted over some transmission medium, such as over electrical wiring or cabling, through fiber optics, or via electromagnetic radiation, wherein, when the computer program code logic 304 is loaded into and executed by a computer, the computer becomes an apparatus for practicing the invention. When implemented on a general-purpose microprocessor, the computer program code logic 304 segments configure the microprocessor to create specific logic circuits.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the viewer's computer, partly on the viewer's computer, as a stand-alone software package, e.g., from a networked system, partly on the viewer's computer and partly on a remote computer or entirely on the remote computer or server. In the latter scenario, the remote computer may be connected to the viewer's computer through any type of network, including a local area network (LAN) or a wide area network (WAN), or the connection may be made to an external computer (for example, through the Internet using an Internet Service Provider).

As described above, features of example embodiments include and other unique features not found in the conventional art.

It should be emphasized that the above-described embodiments of the present invention, particularly, any detailed discussion of particular examples, are merely possible examples of implementations, and are set forth for a clear understanding of the principles of the invention. Many variations and modifications may be made to the above-described embodiment(s) of the invention without departing from the spirit and scope of the invention. All such modifications and variations are intended to be included herein within the scope of this disclosure and the present invention and protected by the following claims.

The invention claimed is:

1. A system for compiling literary works from a specialized database, comprising:
   a database compiled from plural existing literary indexes including biblical scripture references, wherein a master index is harmonized from said existing indexes according to biblical scripture reference terms with deleted duplicates; and
   a user interface, the user interface configured to provide compilation results from said database including biblical scripture reference terms or relative to said biblical scripture reference terms via search.

2. A system in accordance with claim 1, wherein the master index is also augmented by ingestion of additional literary works in digital form that are chopped up based on biblical scripture reference terms, including book, chapter and verse reference terms, extracted from the literary work.

3. A system in accordance with claim 1, wherein search results provide actual keyword results, synonyms or related terms, relative to biblical scripture references, either generated by the master index or imported from said existing indexes into said master index.

4. A system in accordance with claim 3, wherein said search results provide a relevancy score based upon an index of terms linked to bible scripture references.

5. A system in accordance with claim 3, wherein searching is provided according to title, author or topic.

6. A system in accordance with claim 3, wherein a results list provides an abbreviated results list with clickable portions activating expanded information.

7. A system in accordance with claim 3, wherein results from the master index are provided as chunks of a predetermined level.

8. A system in accordance with claim 3, wherein said search results provide indication of classes of rights to use a piece.

9. A system in accordance with claim 3, wherein said search results provide word counts of individual results.

10. A system in accordance with claim 3, wherein said search results provide a clickable source button or link that further describes the source of a particular result.

11. A system in accordance with claim 1, wherein a user interface includes editing tools configured to permit arrangement and publishing of search results.

12. A system in accordance with claim 11, further comprising a mechanism for calculation of compensation to individual authors during compilation, as well as calculation of total royalties due for a particular compiled work.

13. A system in accordance with claim 1, further comprising an administrative interface configured to add a reference to a result.

14. A system in accordance with claim 1, further comprising an administrative interface configured to ingest literary works, wherein said administrative interface provides an indication of ingestion status, allows association of metadata with definable chunks, and allows classification of a literary portion.

15. A method for compiling literary works from a database, comprising:

providing a database compiled from plural existing literary indexes including biblical scripture references, wherein a master index is harmonized from said existing indexes according to biblical scripture reference terms with deleted duplicates, the scripture reference terms cross referenced to content of individual titles of literacy works included within the database; and providing a user interface, the user interface configured to provide compilation results from said database relative to said biblical scripture reference terms via search.

16. A user interface for compiling literary works from a database, comprising:

a user interface, the user interface configured to provide compilation results from a database relative to biblical scripture reference terms via search, wherein the user interface draws results from said database compiled from plural existing literary indexes including biblical scripture references, wherein a master index is harmonized from said existing indexes according to biblical scripture reference terms with deleted duplicates, the scripture reference terms cross referenced to content of individual titles of literacy works included within the database.

* * * * *